Jan. 8, 1935.　　　　K. SCHOENE　　　　1,986,944

ANNULAR VALVE

Filed June 19, 1931　　　2 Sheets-Sheet 1

Inventor
Kurt Schoene
Attorneys

Jan. 8, 1935. K. SCHOENE 1,986,944
ANNULAR VALVE
Filed June 19, 1931 2 Sheets-Sheet 2
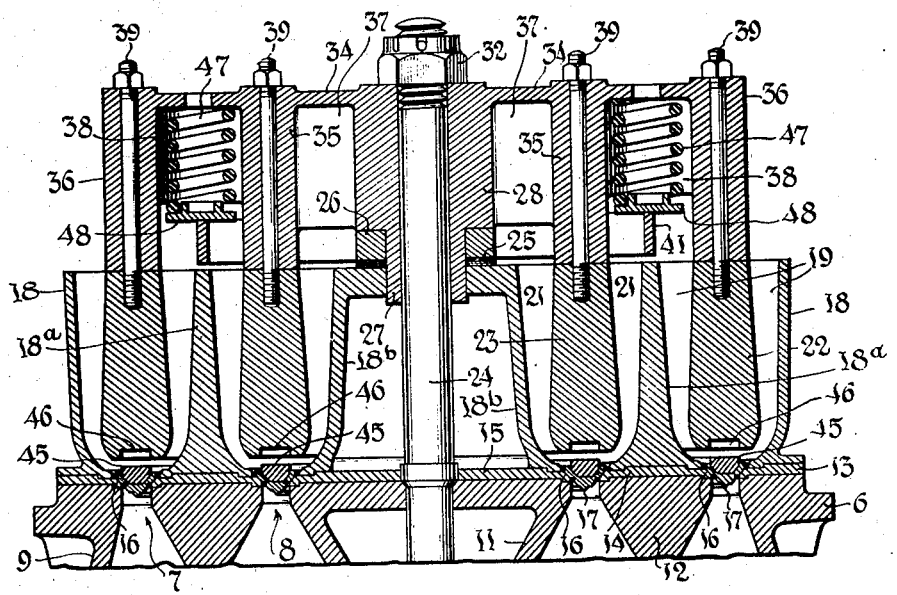
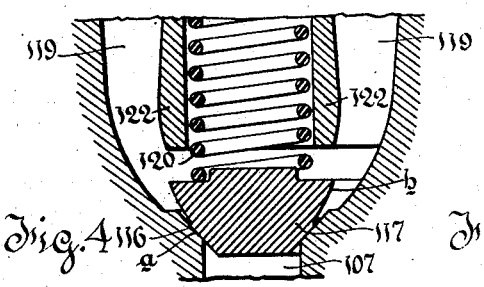
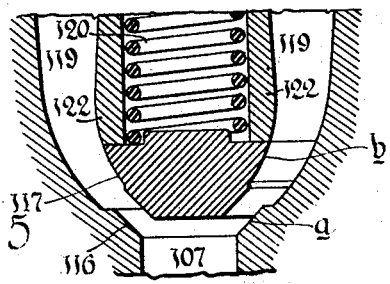
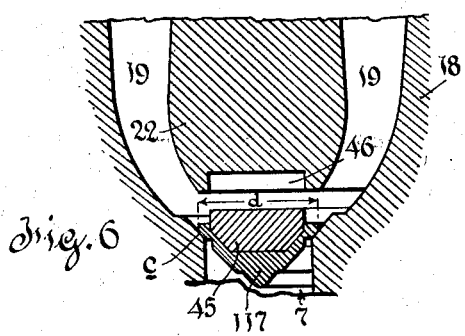
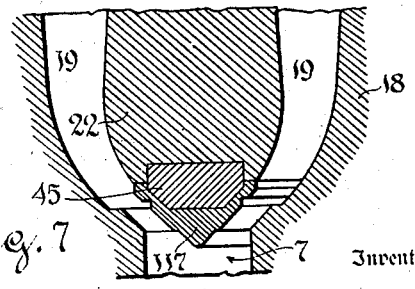
Inventor
Kurt Schoene
By
Attorneys Patented Jan. 8, 1935

1,986,944

UNITED STATES PATENT OFFICE 1,986,944

ANNULAR VALVE

Kurt Schoene, Hamburg, Germany

Application June 19, 1931, Serial No. 545,591
In Germany October 11, 1930

1 Claim. (Cl. 251—144)

This invention relates to discharge valves for liquid pumps, and particularly to valves for pumps running at relatively high speed and delivering against relatively high heads.

In this field the modern tendency is toward the use of annular valves in conjunction with so-called nozzle passages, that is, passages offering gradual changes of section, designed to minimize energy losses in the flow through the valves.

In annular valves of this type each valve underlies a so-called guard ring which separates the two diffusing passages on the discharge side of the valve. The guiding and spring mechanism for annular valves, as heretofore used, has been enclosed within the guard rings and imposes certain limitations on the dimensions of the guard ring and consequently on the design of the valve which adversely affects the performance of the valve.

The present invention involves certain changes in the form of the annular valve which overcome the above-mentioned difficulties in a large measure. These changes are made possible by the use of improved guiding means for the valve, one of which is described and claimed in my copending application Serial No. 545,590 filed June 19, 1931 (which issued September 5, 1933 as Patent No. 1,925,464), and is incidentally illustrated in the present application but not claimed herein.

The present invention will now be described in detail in connection with the accompanying drawings, in which,—

Fig. 3 is a similar section on the line 3—3 of Fig. 1.

Figs. 4 and 5 are fragmentary diagrammatic sections of a prior art construction showing the annular valve in closed and open positions, respectively.

Figs. 6 and 7 are samilar diagrammatic views showing a valve embodying the present invention in closed and open positions, respectively.

Figure 1:
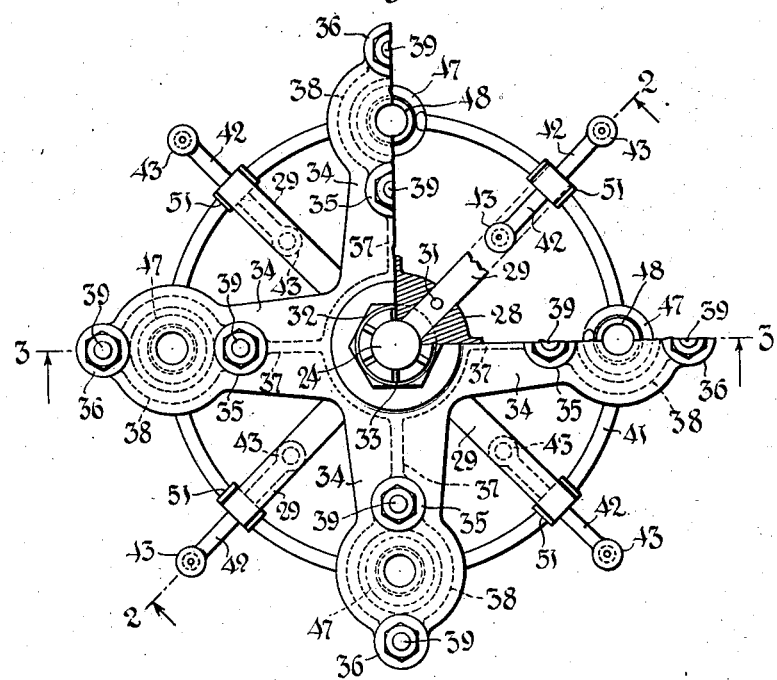
Fig. 1 is a plan view of the valve guiding mechanism.
Figure 2:
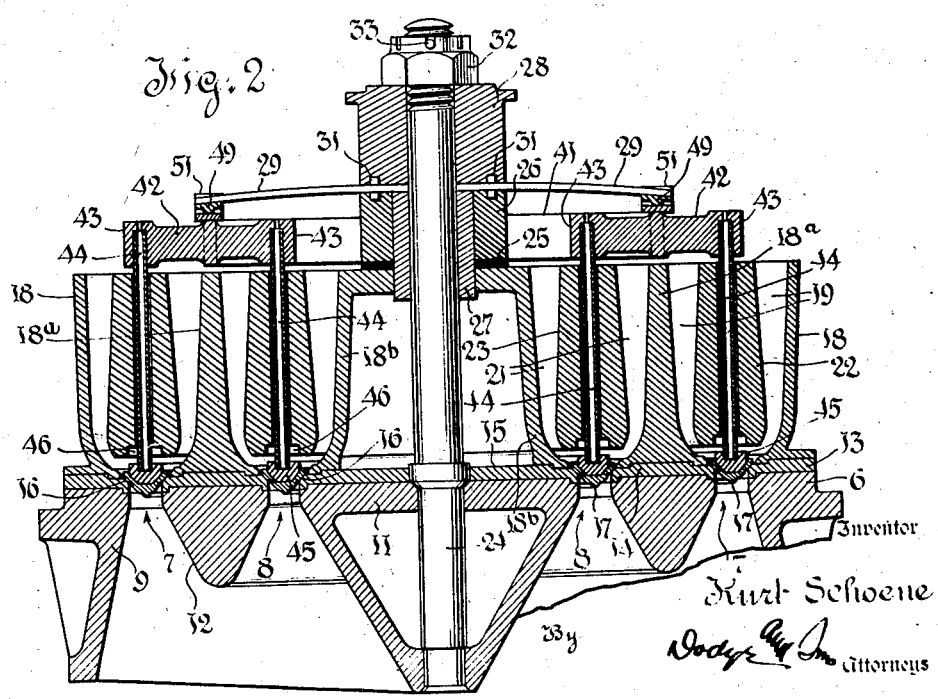
Fig. 2 is a vertical axial section on the line 2—2 of Fig. 1. This figure includes also the valve seats and portions of the valve cage structure.

Referring first to Figs. 1, 2 and 3, 6 represents the valve cage which is preferably cast in one piece and which is formed with two concentric substantially continuous water discharge ports 7 and 8.

Generally stated, the valve cage can be regarded as comprising an outer annular portion 9 and central hub portion 11 and an intervening annular portion 12 connected together by slender radial webs, which do not appear in the drawings, and so formed as to produce the water passages 7 and 8 which taper upwardly to the valve seat, as shown.

Mounted on the cage is a valve seat element made up of an outer annulus 13, an inner annulus 14, and a central disk 15, which are formed with conical seats, indicated at 16, for the annular valves 17 (two of which are shown). The form of these valves 17 will be discussed more in detail hereafter, and is the subject of the present invention.

Overlying the valve seat members 13, 14 and 15 are the three discharge nozzle forming castings 18, 18$^a$, 18$^b$, the members 18 and 18$^a$ being fixed to the seat members 13, 14 and 15 by screws, which do not appear in the drawings. The castings 18, 18$^a$ and 18$^b$ are so formed as to provide two flaring discharge passages 19 for the outer one of the two valves 17, and two similar flaring discharge passages 21 for the inner one of the two valves 17. These passages are isolated from each other and partially defined by the guard rings 22 and 23 which overlie respective valves 17 and which are connected by the studs 39 to the arms 34 and the hub 28. The effect is that the passages 19 and 21 are continuous annular passages.

Fixed in the cage 6 at the center is an upstanding rod 24 which passes through the disk 15 and the casting 18$^b$ and projects above the latter. Immediately above the casting 18$^b$ are a plurality of thin washers or shims 25, and above these washers is a castellated filler piece 26 which encircles a sleeve-like portion 27 on the hub 28. Between the hub 28 and the castellated filler piece 26 are received a plurality of radial leaf springs 29 (four being shown) which are held in place by dowel pins 31 received partly in the filler piece 26 and partly in the hub 28. A castellated nut 32 holds the parts in assembled relation. The nut is pinned as indicated at 33.

The hub 28 carries heavy radial arms 34, four being shown, arranged to alternate with the leaf springs 29. Each of these arms is provided with two heavy bosses 35 and 36. The bosses 35 are connected to the hub 28 by webs 37 and the bosses 35 and 36 are connected by annular webs 38 which form pockets for springs, later to be described. The bosses 35 and 36 are connected respectively to the guard rings 23 and 22 by the studs 39, and thus support and position the guard rings.

The nut 32 forces the hub 28 and its connected parts downward upon the casting 18b, and this in turn confines the valve seat member 15 to close contact with the valve cage 6. The members 26 and 28 clamp the ends of the springs 29 between them so that the inner ends of the radial springs are rigidly supported.

Concentric with the rod 24 is a vertically reciprocable yoke or ring 41. This has arms 42 which extend radially inward and outward therefrom, and which are formed at their ends with hubs 43. Retained in these hubs 43 are vertical tubular thrust members 44 which extend downwardly through passages formed in the valve guards 22 and 23 to receive them. At their lower ends the tubes 44 are inserted in sockets in thrust rings 45 which are seated in grooves in the upper faces or backs of the annular valves 17. The members 45 are received in grooves 46 formed in the lower faces of the guard rings 22 and 23. The ring 41 is urged in a valve-closing direction by a plurality of coil springs 47 (four being shown). These springs are housed in the pockets formed by the webs 38 and react downwardly against spring seats 48 which engage the upper side of the ring 41.

The ring 41 is rather freely guided by the tubular stems 44 and also by the leaf springs 29 which rest on rockers 49. The rockers are confined in spring seats 51 formed on the ring 41 at its junction with each of the arms 42.

The above described structure forms the subject matter of my copending application above identified and is here disclosed as merely one means by which the valve 17 may be spring-loaded and may be guided by means which are spaced from the valve seat and which impose little or no limitation on the design of the guard rings 22 and 23.

Claims for the valve guiding mechanism are not made herein, but are reserved for the copending application.

Referring now to Figs. 4 and 5, which represent prior art construction, the water discharge passage is indicated at 107, the discharge valve seat at 116 and a discharge valve at 117. Portions of the flaring discharge nozzles are indicated at 119, and portions of the guard ring at 122. In this instance the valve is urged to its seat by a coil spring 120 in accordance with prior practice. It is essential that the valve 117, in its full open position, should seat on the lower margin of the guard ring 122, as indicated in Fig. 5. It is also essential, for good hydraulic effect, that when the valve is fully opened there should be above the seating face $a$ of the valve an extension $b$ which merges into the surface of the guard ring 122 and gives a smooth flaring nozzle section. When the valve is fully open, as it is at midstroke, the hydraulic effect is good, but at the end of the discharge stroke, when the valve 117 is approaching its seat, the portion $b$ forms a small venturi which converts the high velocity head past the portion $a$ of the valve, into a considerable pressure head which acts on the upper surface of the valve 117 and causes it to hammer at all speeds of operation of the pump.

Referring now to Figs. 6 and 7, the present invention can be made plain. Because the spring and guiding mechanism is wholly above the guard ring 22, the guard ring can be made of quite narrow section, so that the discharge nozzle is formed wholly between the guard ring 22 and other portions of the casting 18. The sealing area of the valve 17 is indicated at $c$ and above $c$ there is nothing which can produce a Venturi nozzle as the valve approaches its seat. Consequently, the hammering tendency of the valve is very greatly reduced.

Stated somewhat differently, the overall width of the valve indicated by the dimension line $d$ on Fig. 6, exceeds the overall dimension of the two annular seating surfaces little if at all.

While the use of a separate thrust ring 45 is preferred, this is not absolutely essential. The guiding mechanism above disclosed is preferred but the particular structure shown is not strictly essential.

It is preferred to give the valve 17 the generally triangular cross section indicated in the drawings because this tends to reduce eddying, but other forms are possible. By adopting the general form shown in the drawings, it is possible to insure that the flow path past the valve increases substantially uniformly as the valve opens from its closed to its full open position, the path being defined by the space between two parallel opposed surfaces. This feature forms the subject matter of my co-pending application Serial No. 476,657, filed August 20, 1930 (which issued August 9, 1932, as Patent No. 1,870,927), and accordingly is not claimed herein.

What is claimed is,—

A valve mechanism for pumps comprising in combination, a valve cage having two concentric annular discharge passages of gradually increasing cross sectional area separated and partially defined by a guard ring; a valve and a seat therefor underlying said ring at the entrance to said discharge passages, said valve seating against said ring when the valve is fully open, said valve and seat having conical mating surfaces, the mating surface on the valve terminating substantially at the discharge side of the valve and being directly opposed to a continuation of the conical mating surface of the seat when the valve is fully open, whereby the flow passage between the valve and seat in all open positions of the valve is substantially devoid of flaring nozzle characteristics; and yielding means reacting through said guard ring upon said valve to urge the valve in a closing direction.

KURT SCHOENE.